(12) United States Patent
Hafner et al.

(10) Patent No.: US 8,176,405 B2
(45) Date of Patent: May 8, 2012

(54) DATA INTEGRITY VALIDATION IN A COMPUTING ENVIRONMENT

(75) Inventors: James Lee Hafner, San Jose, CA (US); Wendy Ann Belluomini, San Jose, CA (US); Douglas William Dewey, Tucson, AZ (US); Brian D. McKean, Longmont, CO (US); Donald R. Humlicek, Wichita, KS (US); Kevin L. Kidney, Lafayette, CO (US); Theresa L. Segura, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 12/246,195

(22) Filed: Oct. 6, 2008

(65) Prior Publication Data
US 2010/0088579 A1    Apr. 8, 2010

Related U.S. Application Data

(63) Continuation-in-part of application No. 11/860,461, filed on Sep. 24, 2007, now Pat. No. 7,873,878.

(51) Int. Cl.
*H03M 13/00* (2006.01)

(52) U.S. Cl. ......................... 714/807; 714/769; 711/114

(58) Field of Classification Search .................. 714/769, 714/807, 758; 711/114
See application file for complete search history.

(56) References Cited

U.S. PATENT DOCUMENTS

| | | | |
|---|---|---|---|
| 6,336,171 B1 | 1/2002 | Coskrey, IV | |
| 6,742,081 B2 * | 5/2004 | Talagala et al. | 711/114 |
| 6,934,904 B2 | 8/2005 | Talagala et al. | |
| 7,051,155 B2 * | 5/2006 | Talagala et al. | 711/114 |
| 7,131,050 B2 | 10/2006 | Holt | |
| 7,246,281 B2 | 7/2007 | Loaiza et al. | |
| 7,315,976 B2 | 1/2008 | Holt | |
| 7,353,242 B2 * | 4/2008 | Kodama | 1/1 |
| 2001/0047448 A1 | 11/2001 | Sueoka et al. | |
| 2003/0126518 A1 * | 7/2003 | Binger | 714/48 |
| 2004/0205317 A1 | 10/2004 | Walls et al. | |
| 2005/0033933 A1 | 2/2005 | Hetrick et al. | |
| 2005/0228937 A1 * | 10/2005 | Karr et al. | 711/6 |
| 2006/0109792 A1 | 5/2006 | Broadbent et al. | |

OTHER PUBLICATIONS

Baydel Ltd., SAStor14—Optimum use of RAID Levels, 2004, Baydel Technical Bulletin, UK.

* cited by examiner

*Primary Examiner* — Guy Lamarre
(74) *Attorney, Agent, or Firm* — Century IP Group, Inc.; F. Jason Far-hadian, Esq.

(57) ABSTRACT

A method for validating data in a data storage system comprising associating a first data chunk with first check data and storing the first data chunk and the first check data on a first storage device. Additional associated data chunks of the first data and associated additional check data are stored on at least one of the first storage device or one or more additional storage devices. At least a portion of the first check data and at least a portion of the additional check data are stored to a second storage device, which is distinct from the first storage device and the additional storage devices. I/O access to the second storage device is minimized by retaining at least a portion of the first check data and at least a portion of the additional check data in a readily accessible storage medium, during servicing of a first I/O request.

20 Claims, 7 Drawing Sheets

DATA INTEGRITY VALIDATION IN A COMPUTING ENVIRONMENT

CROSS-REFERENCE TO RELATED APPLICATIONS

Pursuant to 35 U.S.C. §120 and 37 CFR 1.78, this application is a continuation-in-part of, and claims the benefit of earlier filing date and right of priority to U.S. patent application Ser. No. 11/860,461, filed on Sep. 24, 2007, now U.S. Pat. No. 7,873,878 the content of which is hereby incorporated by reference herein in its entirety.

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention exclusively to material associated with such marks.

FIELD OF INVENTION

The present invention relates generally to data storage systems and, more particularly, to data validation in a data storage system.

BACKGROUND

Storing and retrieving data from large capacity storage systems (e.g., systems with a plurality of disk drives) generally requires certain safeguards against data corruption to ensure data integrity and system reliability.

Certain disk behaviors contribute to corruption of data stored on a disk drive. During a write, the disk arm and head must align with very accurate precision on the track that comprises the physical block in order to deposit the new "bits" of write data. In the case of a write, two tracking errors can occur. Either the head can be misaligned so badly that the data is written to a completely unintended track or the head may be misaligned so that the data falls in a gap between two adjacent tracks. Both types of write errors are referred to as Undetected Write Errors because the disk drops the write data in the wrong location and does not itself detect the problem.

Another type of error is a misaligned head placement when reading data. In this case, the head may read the data bits from a completely unintended track (i.e., Far Off-track Read) or from a gap between two tracks (i.e., Near Off-track Read) and return incorrect data to the user or application. Both of these errors are typically transient and are corrected when a subsequent read occurs to the same track. In addition, if the head reads tracks correctly but from the unintended target of a Far Off-track Write, incorrect data will be returned to the user or requesting application.

In all the above scenarios, the drive typically does not detect a problem and returns a successful status notice to the user, host or application. Other error scenarios may also occur where the disk returns a success status while the user or application gets incorrect data. Such write or read errors can be referred to as Undetected Disk Errors (UDEs). Because a disk drive cannot independently detect UDEs, other methods need to be provided to detect such errors. Two main solution classes are available in the related art for verifying the accuracy of data read or written to disk drives.

The first class is the file system or the application layer. For example, some file systems and many database systems use checksums on data chunks (e.g., 4 KB chunks) which are stored separate from the data chunks themselves. The checksums are read along with the data chunks; new checksums are recomputed from the read data chunks and are compared with the checksums read along with the data chunks. If the new checksum matches the old ones, then the read data chunk is assumed to be correct.

The above method has two fundamental limitations. First, said method typically cannot recover from detected errors, unless they are also integrated with some additional data redundancy such as redundant array of independent disk drives (RAID). Second, said method is not always the source for every disk read, and so checking may not occur as often as necessary.

For example, when the source of a disk read is not the file system or application layer, an underlying (and logically separate) layer in a RAID architecture may perform reads in the context of an application write (e.g., in a read-modify-write scenario). The application layer does not validate these types of reads. In such a case, the read may extract incorrect data from the disk and then use this incorrect data to update the RAID redundancy data. Thus, an error that goes undetected by the application may propagate errors in the underlying RAID layer, compounding the problem created by the drive.

RAID is a disk subsystem that is used to increase performance and/or provide fault tolerance. RAID architecture comprises a plurality of disk drives and a disk controller (also known as an array controller). RAID improves performance by disk striping, which interleaves bytes or groups of bytes across multiple drives, so more than one disk is reading and writing simultaneously. Fault tolerance is also achieved in a RAID architecture by way of implementing mirroring or parity.

A second class of methods to detect UDEs are implemented in the storage system itself, at a layer that is closer to the hardware layer so that every disk read and write that occurs in the system is monitored, whether the read or write is generated by the application layers or by the storage system layer itself. This class, however, cannot detect errors that occur in system layers that are higher than the storage system (e.g., in the network or internal host busses). It is desirable to have a method that not only detects a problem but also is capable of also locating where the error occurs and, further, to correct the errors if possible.

There are a number of subclasses of methods that can be used within the storage system for detection of possible location and correction of UDEs. The first is based on parity scrubbing. RAID systems that protect against disk failures (such as RAID1 or RAID5) may use a method called "parity scrub" to detect these sorts of errors. For example, in a RAID5 system, the process involves reading the data and the respective redundancy data (i.e., parity data), recomputing the parity value and comparing the computed parity value with the parity value read from disk.

If the two parity values do not match, then an error has occurred. Unfortunately, RAID5 does not provide a means to locate or correct an error detected in the above manner. More importantly, these parity scrubs may not detect errors that have been masked by other operations that were applied to data between the occurrence of a UDE and the parity scrub operation.

For example, a UDE may occur during a write to a first disk in a RAID5 array that comprises four data disks and one parity disk. Subsequently, a write may be issued to the array for the second, third and fourth disks. Typically, an array will promote this operation to a full write by reading the data from the first disk, computing parity and writing out the new data to second, third and fourth disks and to the parity disk. After this operation, the data on the first disk is still incorrect, but the parity is now consistent with all the data (i.e., the parity now comprises the bad data on the first disk). As a result, a subsequent parity scrub will not detect the bad data.

Another example of error propagation occurs when subsequent to a UDE, a successful and correct write (e.g., using a read-modify-write methodology) occurs to the same location. Such operation will leave the parity corrupted with the effects of the bad data. In effect, the bad data moves from the disk with the UDE to the parity disk. Such migration effects can occur whenever the bad data is read from the disk in order to perform any write operation to the stripe.

Similar and even more complicated scenarios occur even with higher fault tolerant RAID algorithms such as RAID6. RAID6 is a fault tolerant data storage architecture that can recover from the loss of two storage devices. It achieves this by storing two independent redundancy values for the same set of data. In contrast, RAID5 only stores one redundancy value, the parity.

A parity scrub on a RAID6 array can detect, locate and correct a UDE (assuming no disks have actually failed) but only if no operations were performed on the stripe that may have migrated or hidden the UDE. Parity scrubs are very expensive operations and are typically done sparingly. Consequently, the conditional assumption that no operations that migrated or failed to detect UDEs have occurred before the scrub rarely holds in practice.

A location algorithm in the context of RAID6 (or higher fault tolerance) is disclosed in US Patent Application 2006/0248378, "Lost Writes Detection in a Redundancy Group Based on RAID with Multiple Parity." This location algorithm must be used in conjunction with parity scrubs as an initial detection method. RAID parity scrub methods are incapable of reliably detecting and/or locating and correcting UDEs in an array.

A second subclass of methods for addressing the problem of UDEs within the storage system is based on the write cache within the system. The method described in US Patent Application 2006/0179381, "Detection and Recovery of Dropped Writes in Storage Devices" uses the cache as a holding place for data written to disk. Only after the data is re-read from the disk and verified is the data cleared from the cache. This is an expensive method due to a number of factors.

First, the discussed method requires using valuable cache space that could be used to improve read/write cache performance of the system. Second, it requires a separate read call (at some unspecified time) in order to validate the data on the disk. If that read occurs immediately after the data is written, Off-track Write Errors may not be detected because the head tracking system may not have moved.

If the read occurs when the system needs to clear the cache (e.g., to gain more cache space for another operation), then a pending operation will be delayed until the read and compare occurs. Alternatively, the read could happen at intermediate times, but it will impact system performance with the extra IOs.

A third subclass uses some form of metadata to manage the correctness of the data. The metadata is stored in memory and possibly on separate disks or arrays from the arrays the metadata represents. For example, US Patent Application 2005/0005191 A1, "System and Method for Detecting Write Errors in a Storage Device," discloses a method for UDE detection. A checksum and sequence number for each block in a set of consecutive data blocks is stored in an additional data block appended immediately after. A second copy is stored in memory for the entire collection of blocks on the disk and this copy is periodically flushed to disk (which necessarily is a different disk) and preferably is stored on two disks for fault tolerance.

A related scheme is found in U.S. Pat. No. 06,934,904, "Data Integrity Error Handling in a Redundant Storage Array" where only checksums are used, but no particular rule is defined for the storage of the primary checksum. US Patent Application 2003/0145279, "Method for using CRC as Metadata to Protect Against Drive Anomaly Errors in a Storage Array" discloses a similar checksum algorithm for detection together with a location algorithm.

The above schemes suffer from the problems of high disk overhead and the additional IOs required to manage and preserve the checksum/sequence number data. Other examples of the third subclass are disclosed in U.S. Pat. No. 07,051,155, "Method and System for Striping Data to Accommodate Integrity Metadata."

The fourth subclass of storage based UDE detectors is similar to the third subclass in that the fourth subclass also uses some form of metadata to verify correctness of data read from disk. However, in the fourth subclass, the metadata is kept within the array and is collocated with the data or the parity in the array. For example, U.S. Pat. No. 07,051,155, "Method and System for Striping Data to Accommodate Integrity Metadata" discloses an embodiment where one copy of the stripe metadata is stored within the stripe.

The above scheme provides a significant performance advantage when the system performs a read-modify-write to update data in the stripe. The method described in US Patent Application US2004/0123032, "Method for Storing Integrity Metadata in Redundant Data Layouts" uses extra sectors adjacent to the sectors of the parity strip(s) to store the metadata for the data chunks in the stripe. This method includes use of a generation number on the metadata, stored in NVRAM in order to verify the contents of the metadata.

Other examples of the fourth subclass include the methods applicable to RAID5 arrays that are described in U.S. Pat. No. 04,761,785, "Parity Spreading to Enhance Storage Access;" US Patent Application 2006/0109792 A1, "Apparatus and Method to Check Data Integrity When Handling Data;" and U.S. Pat. No. 07,051,155, "Method and System for Striping Data to Accommodate Integrity Metadata."

In some disk storage systems, metadata is stored in non-volatile read access memory (NVRAM) or on rotating disks. The former has significant cost and board layout issues to accommodate the total volume of metadata that must be stored and managed, as well as the means to maintain the memory in non-volatile state. Furthermore, such memory takes a lot of motherboard real estate and this can be problematic.

Particularly, in fault tolerant storage systems, with at least two coordinated controllers, the NVRAM must be shared between the two controllers in a reliable manner. This introduces complex shared memory protocols that are difficult to implement and/or have performance penalties. Rotating disks, on the other hand, have significant performance penalties and reliability issues. That is, a rotating disk has very low latency compared to memory, so accessing (e.g., reading or writing) the metadata can have a significant performance impact on the overall system.

Additionally, rotating disks have a fairly low reliability record compared to memory. Consequently, vital metadata need to be stored at least as reliably as the data it represents. For example, when data is stored in a RAID6 array, wherein two disk losses may be tolerated, the metadata should also be stored in a manner that can survive two disk losses as well.

Unfortunately, the above requirements impose significant additional costs and performance impacts, because the above-mentioned classes and subclasses for detecting and correcting UDEs are either inefficient or ineffective in uncovering sufficient details about a read or write error to help locate and fix a problem in many circumstances. Also, detecting and correcting UDEs may be very intrusive, especially with respect to RAID layers. Thus, systems and methods are needed to overcome the aforementioned shortcomings.

SUMMARY

The present disclosure is directed to a systems and corresponding methods that facilitate data validation in disk storage systems.

For the purpose of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for validating data in a data storage system is provided. The method comprises associating a first data chunk with a first check data calculated for the first data chunk, so that the first check data is accessed together with the first data chunk in a single input/output (I/O) operation directed to the first data chunk. A first data is stored across the storage devices in data chunks, so that the first data chunk and first check data are stored on a first storage device. One or more additional associated data chunks of the first data and associated additional check data are stored on at least one of the first storage device or one or more additional storage devices.

At least a portion of the first check data and at least a portion of the additional check data are stored to a second storage device, so that the portion of the first check data is accessed together with the portion of the additional check data in a single I/O operation directed to the second storage device. The second storage device is distinct from the first storage device and the additional storage devices. I/O access to the second storage device is minimized by retaining at least a portion of the first check data and at least a portion of the additional check data in a readily accessible storage medium, during servicing of a first I/O request.

In accordance with another embodiment, a system for validating data in a data storage system is provided. The system comprises one or more first storage devices for storing first data. The first data is comprised of data chunks, wherein each data chunk is associated with check data stored with the data chunk. A first data chunk and associated first check data are accessed in a single input/output (I/O) operation, and the first check data is used to validate the first data chunk.

The system also comprises a second storage device for storing a portion of the first check data and a portion of additional check data associated with additional data chunks from among the data chunks. The stored portions are accessed in a single I/O operation, and the portion of the first check data is used to validate the first check data. One or more drive proxies are implemented to virtualize the first storage devices. The drive proxies also minimize I/O accesses to the second storage device when servicing I/O requests to access the stored portions of the first check data and the additional check data.

In accordance with yet another embodiment, a computer program product comprising a computer useable medium having a computer readable program is provided. The computer readable program when executed on a computer causes the computer to perform the functions and operations associated with the above-disclosed systems and methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

In accordance with one or more embodiments, systems and methods for detecting and correcting UDEs are provided. By way of example, certain embodiments are disclosed herein as applicable to a RAID architecture. It should be noted, however, that such exemplary embodiments should not be construed as limiting the scope of the invention to a RAID implementation. The principles and advantages disclosed herein may be equally applicable to other data storage environments.

In accordance with one embodiment, data may be written to disk drives in conjunction with protection information. The term protection information as used here refers to information that can be used to detect whether data written to or read from a storage medium has been corrupted and to help restore the corrupted data when possible, as provided in further detail below. Depending on implementation, protection information may comprise parity information and check data (e.g., validity metadata (VMD) and atomicity metadata (AMD)) as provided in more detail in U.S. patent application Ser. No. 11/860,461 the content of which is incorporated by reference herein in entirety.

VMD provides information (e.g., timestamp, phase marker, sequence number, etc.) that allows a storage system to determine whether data written to a storage medium has been corrupted. AMD provides information (e.g., checksum) about whether data and the corresponding VMD were successfully written during an update phase. Parity information is used to detect errors in a data storage environment by comparing parity bits for data before and after transmission using exclusive-or (XOR) calculations, for example.

Figure 1:
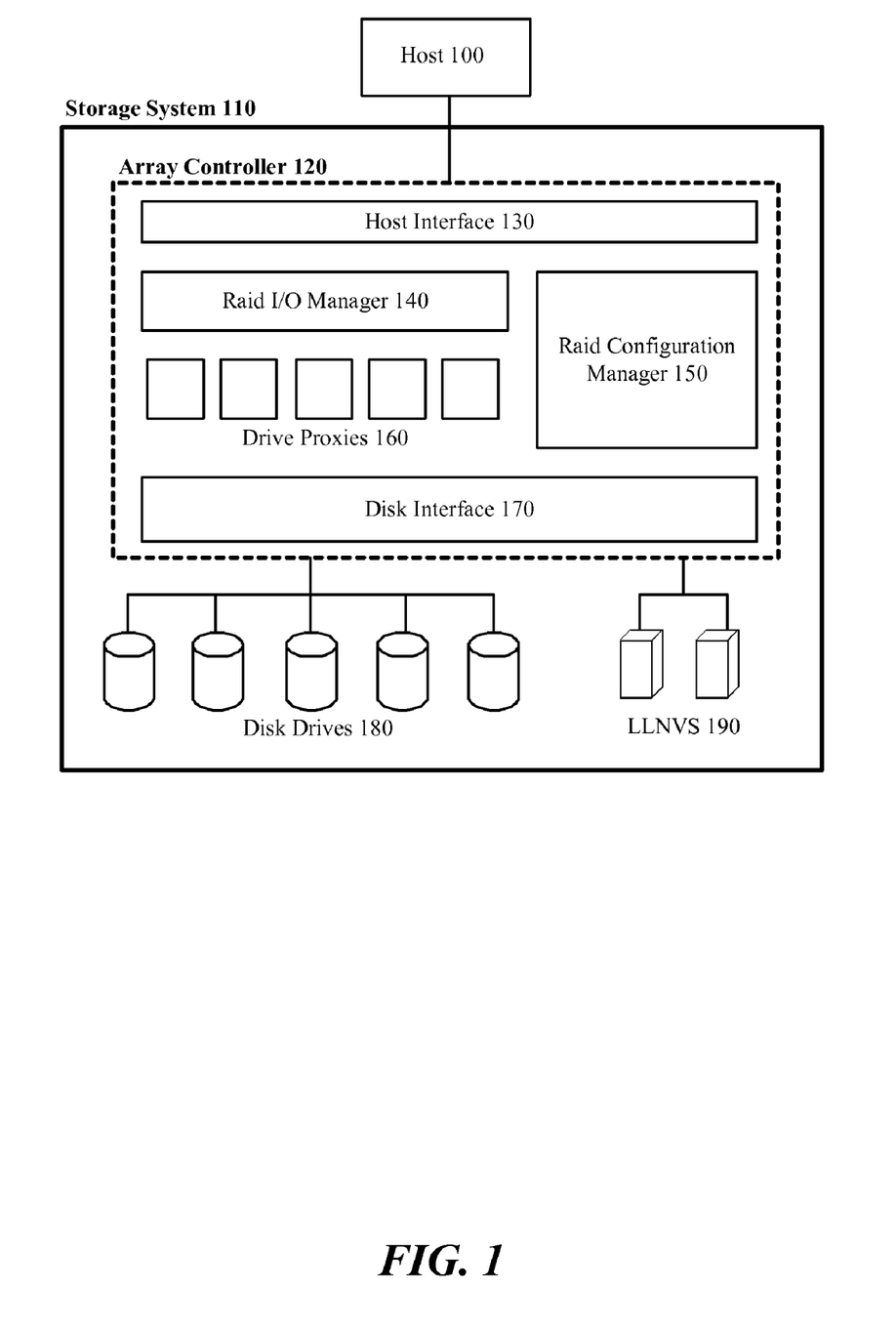
FIG. 1 is a block diagram of an exemplary data storage environment and its components, in accordance with one or more embodiments.

Referring to FIG. 1, an exemplary data storage environment in accordance with one or more embodiments is provided. The data storage environment may comprise a storage system 110 connected to a host (e.g., computing system) 100 by way of host interface 130. Storage system 110 provides host 100 with one or more virtual disks (not shown) that are mapped to one or more physical disk drives 180.

Array controller 120 may comprise a RAID I/O manager 140, a RAID configuration manager 150, and a disk interface 170, for example. Array controller 120 services read and write requests and other input and output (I/O) requests for disk drives 180 by way of disk interface 170. In some embodiments, array controller 120 may also comprise drive proxies 160, which are mapped to disk drives 180. Depending on implementation, RAID I/O manager 140 may forward I/O requests directly to drive proxies 160. Or, RAID I/O manager 140 may forward I/O requests to disk interface 170, and disk proxies 160 may intercept the requests. Drive proxies 160 are components that are included in storage system 110 component hierarchy between RAID I/O manager 140 and disk interface 170. In other embodiments, array controller 120 may comprise a single drive proxy disk interface for disk drives 180 instead of drive proxies 160.

Drive proxies 160 intercept read and write operations to the physical disk drives 180. For read operations, drive proxies 160 perform validation of the data returned by the disk drives 180 and provide validated data to the RAID I/O manager 140. For write operations, drive proxies 160 accept new write data from RAID I/O Manager 140 and manage the preparation and storage of validation metadata before the user data is written to the physical disk drives 180.

RAID I/O manager 140 services I/O requests and manages data redundancy so that storage system 110 may continue to operate properly in the event of data corruption. RAID configuration manager 150 provides RAID I/O manager 140 with mapping information between the virtual disks and the disk drives 180. Low-latency non-volatile storage (LLNVS) 190 (e.g., flash drives) may be utilized to store one or more copies of check data associated with data stored on disk drives 180 to provide further data redundancy and faster access. In this manner, data may be validated in more reliable and efficient manner in case an error is detected.

Figure 2:
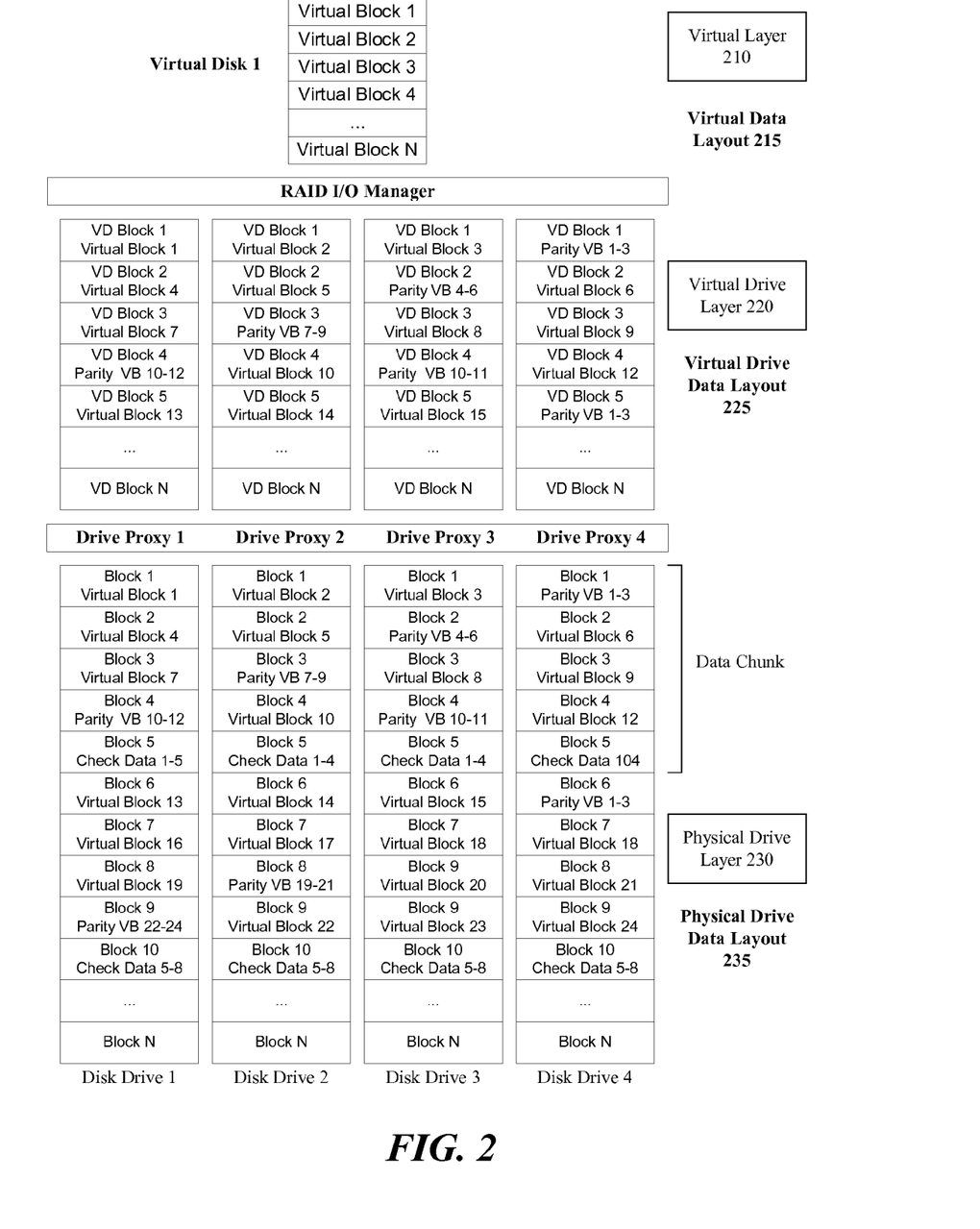
FIG. 2 is a block diagram of an exemplary data layout for a data storage system, in accordance with one embodiment.

Referring to FIGS. 1 and 2, in accordance with one embodiment, storage system 110 may be implemented in a layered architecture with one or more of the following layers: virtual layer 210, virtual drive layer 220, and physical drive layer 230. The use of multiple layers provides a logical abstraction that allows components of storage system 110 to be independent from each other, so that modification of one component does not require modification of all the other components in the system. In certain embodiments, virtual drive layer 220 provides an additional layer protection by utilizing drive proxies 160 that help keep data validation independent of the RAID implementation, thus minimizing intrusion into the RAID architecture when possible.

Virtual layer 210 may comprise one or more virtual disks (e.g., virtual disk 1) that are accessible by host 100. Data is written to the virtual disks in one or more virtual blocks (e.g., virtual block 1, . . . , virtual block N). RAID configuration manager 150 provides RAID I/O manager 140 with mapping information so that RAID I/O manager 140 can map the data according to virtual drive data layout 225. For example, virtual blocks 1 through 3 may be mapped to virtual drive block 1, which is distributed across drive proxies 1 through 4.

Parity information for virtual blocks 1 through 3 may be stored in virtual drive block 1 on drive proxy 4. Parity information for other sets of virtual blocks is distributed across drive proxies 1 through 4 so that storage system 110 can continue to operate properly if one of disk drives 180 fails or if data on one of the disk drives 180 is corrupted.

As shown in FIGS. 1 and 2, physical drive layer 230 may comprise one or more physical disk drives 180, for example, corresponding to disk drives 1 through 4. Drive proxies 160, corresponding to drive proxies 1 through 4, for example, may map virtual blocks to disk drives 180 and store parity information. The mapping scheme may be implemented in a similar way as implemented by RAID I/O manager 140. Desirably, drive proxies 160 store check data associated with data stored on the respective disk drives 180, in addition to the mapping information.

Referring to the exemplary physical drive data layout 235 shown in FIG. 2, each four blocks of data may be followed by a fifth block that includes the associated check data, in one implementation. Thus, the fifth block is utilized for storing the check data including protection information (e.g., VMD and AMD) needed for validation of data stored in the first four blocks. It is noteworthy that other physical drive data layouts are possible wherein check data is stored in every nth block such that it can be accessed, desirably, at the same time as the corresponding data (e.g., in a single read/write instruction) to maximize system performance.

Figure 3:
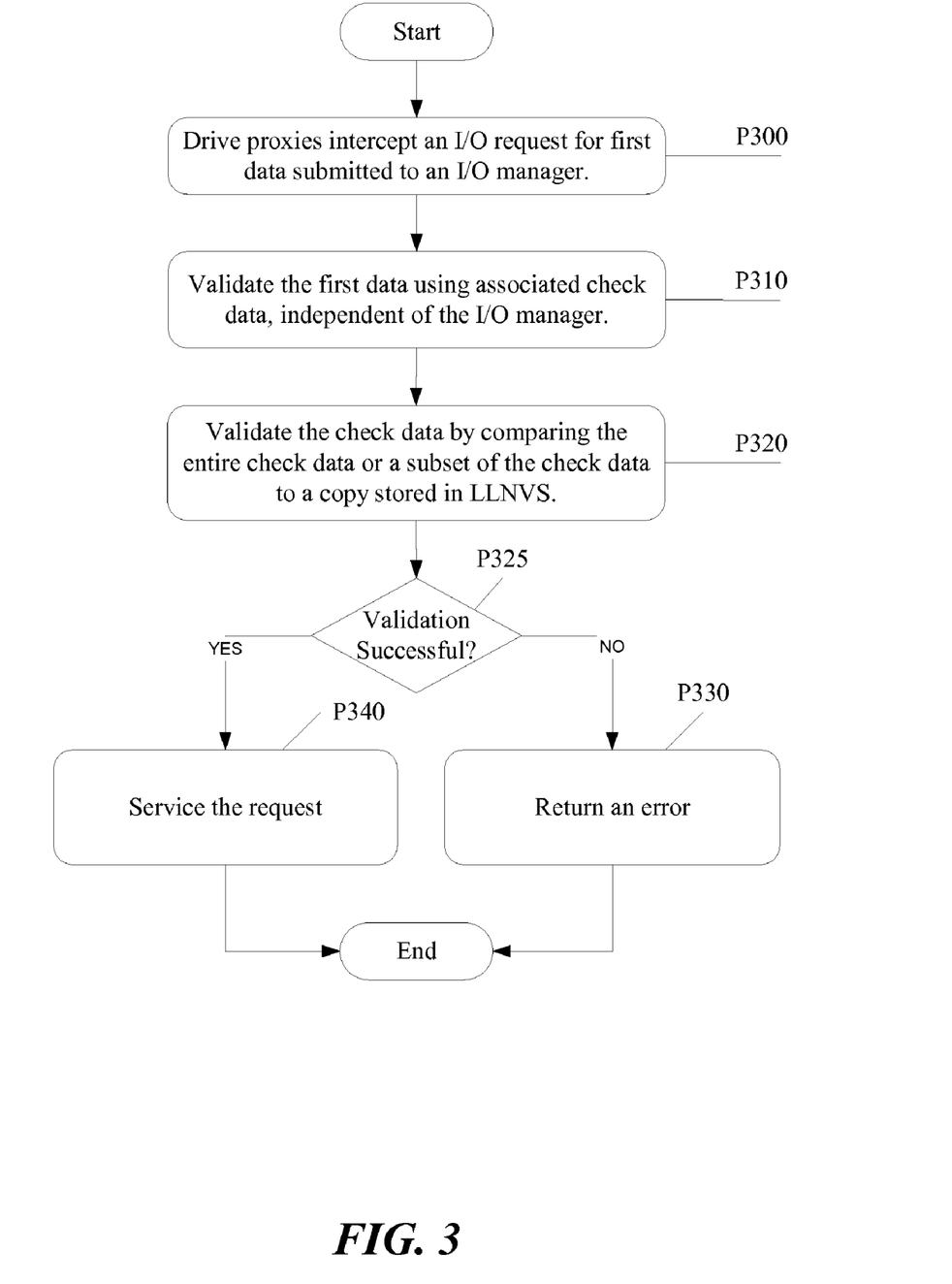
FIG. 3 is a flow diagram of a method for checking validation data for a read request, in accordance with one embodiment.

Referring to FIGS. 1 and 3, in accordance with one embodiment, host 100 submits an I/O request for first data to RAID I/O manager 140. One or more drive proxies 160 intercept the request (P300), and validate the first data using check data stored in association with data in another data block (P310). In some embodiments, the check data may not be accessible by RAID I/O manager 140. Thus, instead of the RAID I/O manager 140, drive proxies 160 may be used to validate the check data by comparing the check data or a subset of the check data with a copy of the check data stored in a storage device (e.g., LLNVS 190) (P320). If validation of either the first data or the check data fails (P325), drive proxies 160 return an error to RAID I/O manager 140 (P330). If validation is successful (P325), the request is serviced by RAID I/O manager 150 (P340).

Figure 4:
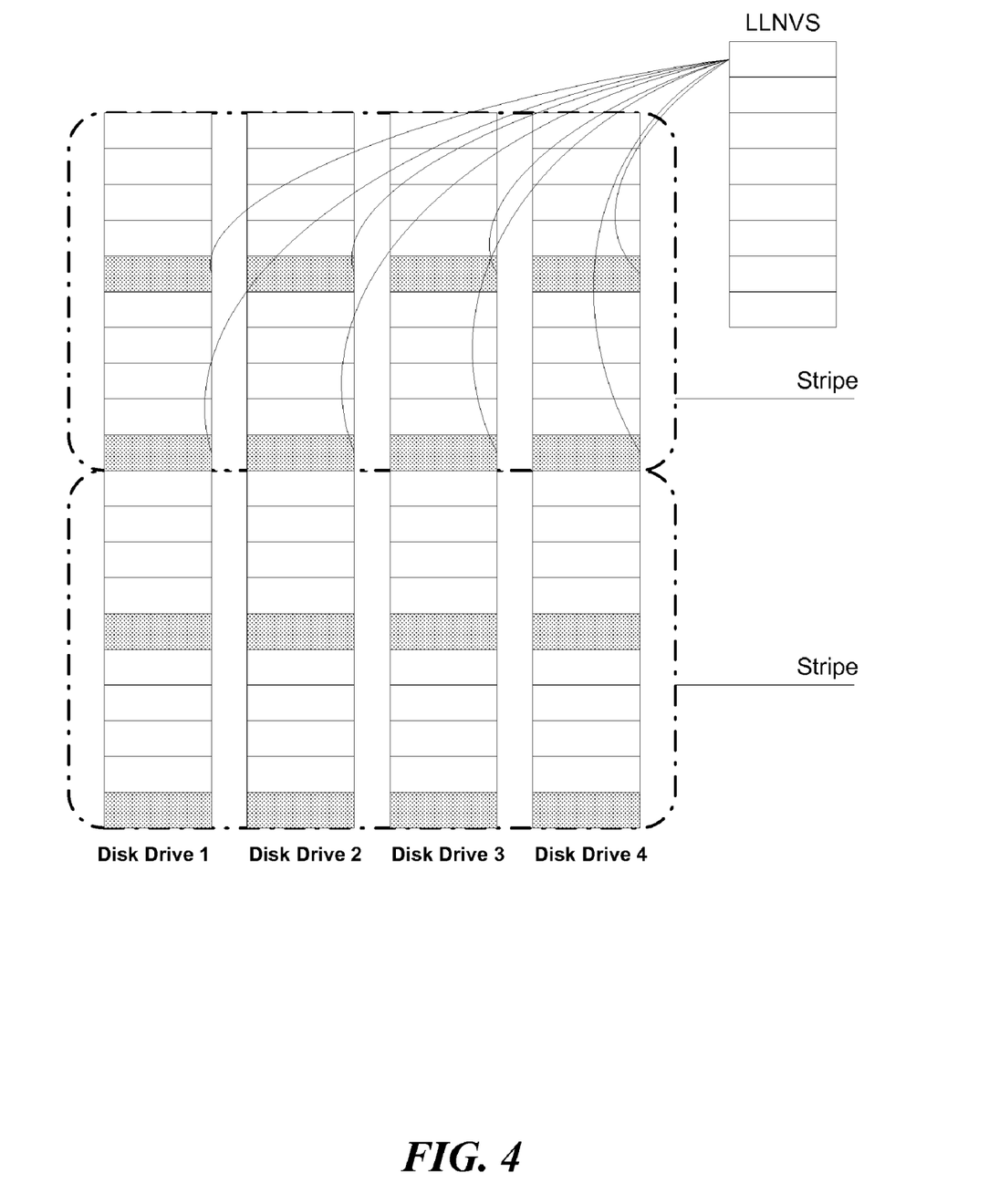
FIG. 4 is an exemplary block diagram for mapping check data on storage devices to copies in low latency non-volatile storage (LLNVS), in accordance with one embodiment.

Referring to FIGS. 1 and 4, in accordance with one embodiment, check data or a subset of the check data stored in disk drives 180 is copied and stored in storage media or devices such as LLNVS 190 with high access rates. A high access rate means that data can be read or written to the storage media or device at a high rate of speed in comparison to slower storage media (e.g., tape drives, hard disk drives, etc.). As shown in the exemplary illustration in FIG. 4, the contiguous blocks of non-shaded data are data chunks, and the shaded blocks following the data chunks are check data blocks. The two sets of data chunks and check data blocks on disk drives 1 through 4 may be referred to as a stripe.

In certain embodiments, one or more check data blocks in a first stripe are copied to the first block of LLNVS 190 so that there is a one-to-one correspondence between a stripe on disk drives 180 and a block on LLNVS 190. Such arrangement improves the performance of storage system 110 as RAID configuration manager 150 schedules read and write operations on a stripe by stripe basis. In the following, one or more embodiments are disclosed by way of example as utilizing LLNVS 190 as means for storing copies of check data. As discussed earlier, however, any other type of storage medium or device may be used.

Depending on implementation, each stripe may comprise fewer or more data chunks than that provided in the suggested exemplary embodiments herein. The size of a data chunk may be configured so that an integral multiple of data chunks fit in a stripe, for example. Data on disk drives 180 may be stored such that check data associated with a stripe is stored contiguously on LLNVS 190, so that the check data is read or written in conjunction with the associated data in a single operation, for example, and such that protection information stored on LLNVS 190 can be shared and made available to several drive proxies 160 as provided in further detail below.

Figure 5:
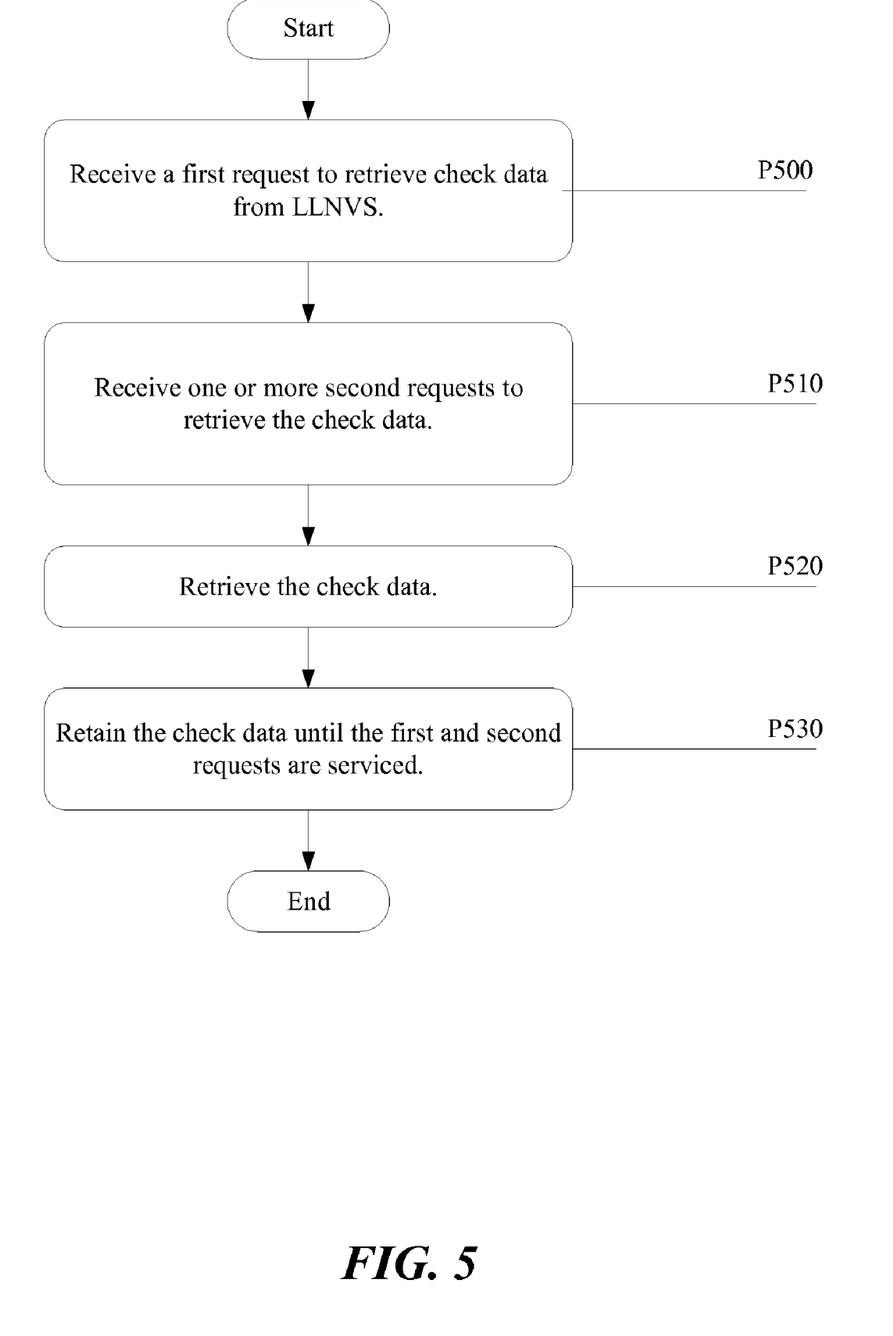
FIG. 5 is a flow diagram of an exemplary method for coordinating access to LLNVS, in accordance with one embodiment.

In one embodiment, RAID I/O manager 140 provides a coordination mechanism that enables drive proxies 160 to coordinate their accesses to LLNVS 190. For example, upon receiving an I/O request that spans two or more virtual disks, RAID I/O manager 140 may append to each of the virtual disk I/O requests a data structure that indicates that these virtual disk I/O requests are related to the same stripe. Upon receiving these virtual disk I/O requests, drive proxies 160 examine the data structure and determine that the I/O requests are related. In this way, drive proxies 160 may coordinate their access to check data stored on LLNVS 190 to minimize the number of accesses to LLNVS 190 and make data validation more efficient. Referring to FIGS. 1 and 5, in accordance with one embodiment, a first request is received to access check data on LLNVS 190 (P500). At a same or subsequent time, a second request to access the check data may be received (P510). In response, the check data is retrieved (P520) and retained until each of the first and second requests are serviced (P530).

In accordance with another embodiment, an exemplary RAID5 storage system receives a small write request. Upon receiving the small write request, RAID I/O manager 140 generates four virtual disk I/O requests comprising of a request to read old data from a first virtual disk, a request to read old parity information from a second virtual disk, a request to write the new data to the first virtual disk, and a request to write new parity information for the new data to the second virtual disk. Each of the I/O requests to the virtual disks may involve accessing LLNVS 190 to read and update the VMD for the involved stripe. To assist drive proxies 160, RAID I/O manager 140 associates or appends a data structure to each of the four virtual disk I/O requests before forwarding the requests to drive proxies 160. The data structure may indicate (e.g., via pointers) that the four virtual disk I/O requests are related.

Upon receiving the first read request, a first drive proxy 160 reads the VMD for the entire stripe once from LLNVS 190. If the first drive proxy 160 determines that one or more second requests may need to access the VMD, the first drive proxy 160 may make the VMD available to one or more second drive proxies 160 that are handling the second requests by, for example, caching the VMD in a shared memory. Alternatively, the first drive proxy 160 may attach a pointer to the VMD onto the shared data structure provided by RAID I/O manager 140. Thus, the second drive proxies 160 may avoid accessing LLNVS 190 to retrieve VMD for the same stripe and instead access the VMD directly from the shared memory or data structure.

Upon receiving the first write request, a first drive proxy 160 updates the VMD for the written data. If the first drive proxy 160 determines that one or more second requests may need to access the VMD, the first drive proxy 160 does not write the updated VMD to LLNVS 190 until one or more second drive proxies 160 finish handling the second requests. Once drive proxies 160 determine that reads and updates to the VMD have completed, the VMD is written once to LLNVS 190. Thus, reads and updates to LLNVS 190 are minimized, improving system performance. It is noteworthy that the coordination mechanism is not limited to the above-mentioned embodiments and can be implemented in any situation where coordination may reduce the number of accesses to LLNVS 190 to enable better overall system performance.

Certain aspects and advantages of the invention are disclosed as applicable to an exemplary algorithm applied in the context of an exemplary host operation (e.g., a read operation). It is noteworthy, however, that the principles and advantages disclosed can be equally applied to other operations in accordance with other embodiments.

In different embodiments, the invention can be implemented either entirely in the form of hardware or entirely in the form of software, or a combination of both hardware and software elements. For example, the error handlers may comprise a controlled computing system environment that can be presented largely in terms of hardware components and software code executed to perform processes that achieve the results contemplated by the system of the present invention.

Figure 6:
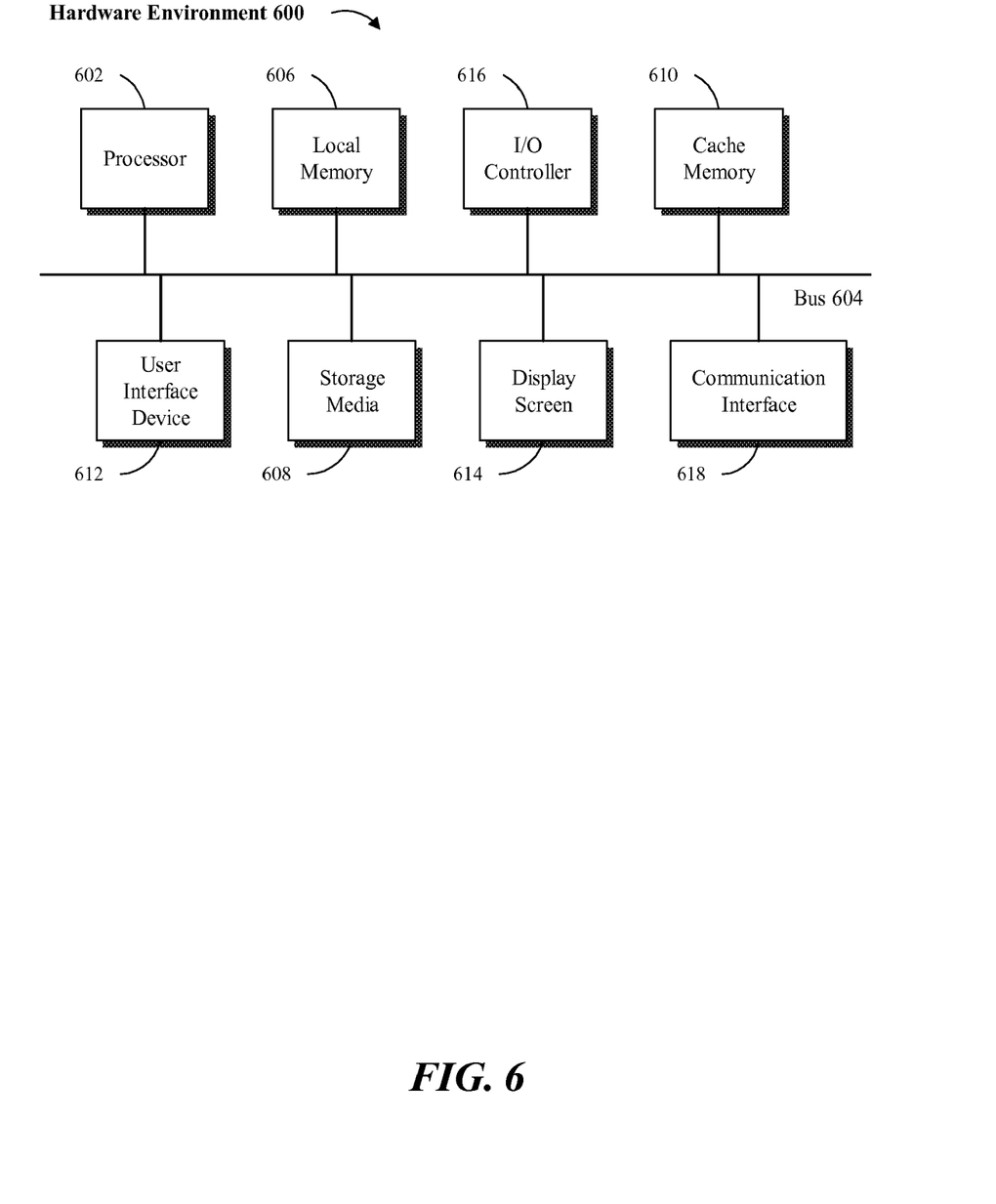
FIGS. 6 and 7 are block diagrams of hardware and software environments in which the system of the present invention may operate, in accordance with one or more embodiments.
Figure 7:
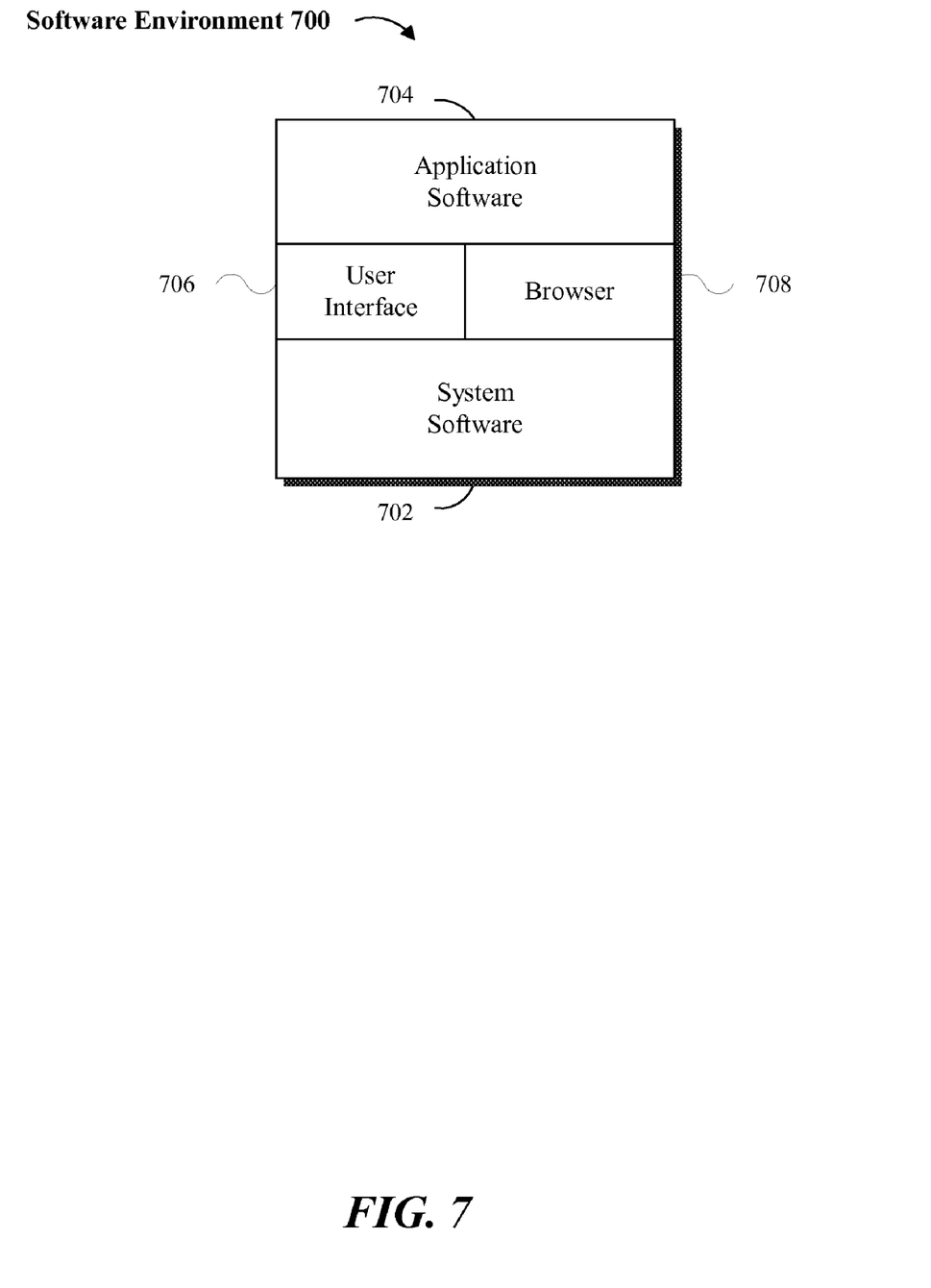

Referring to FIGS. 6 and 7, a computing system environment in accordance with an exemplary embodiment is composed of a hardware environment 600 and a software environment 700. The hardware environment 600 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 700 is divided into two major classes comprising system software 702 and application software 704. System software 702 comprises control programs, such as the operating system (OS) and information management systems that instruct the hardware how to function and process information.

In one embodiment, the data validation processes noted above may be implemented as application software 704 executed on one or more hardware environments to facilitate error detection and data recovery in storage system 110, Application software 704 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 6, an embodiment of the application software 804 can be implemented as computer software in the form of computer readable code executed on a data processing system such as hardware environment 600 that comprises a processor 602 coupled to one or more memory elements by way of a system bus 604. The memory elements, for example, can comprise local memory 606, storage media 608, and cache memory 616. Processor 602 loads executable code from storage media 608 to local memory 606. Cache memory 616 provides temporary storage to reduce the number of times code is loaded from storage media 608 for execution.

A user interface device 612 (e.g., keyboard, pointing device, etc.) and a display screen 614 can be coupled to the computing system either directly or through an intervening I/O controller 610, for example. A communication interface unit 618, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 600 may not include all the above components, or may comprise other components for additional functionality or utility. For example, hardware environment 600 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 7, application software 704 can comprise one or more computer programs that are executed on top of system software 702 after being loaded from storage media 708 into local memory 706. In a client-server architecture, application software 704 may comprise client software and server software. For example, in one embodiment of the invention, client software may be executed on host 100 and server software is executed on storage system 110.

Software environment 700 may also comprise browser software 808 for accessing data available over local or remote computing networks. Further, software environment 700 may comprise a user interface 706 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for validating data in a data storage system, the method comprising:
    associating a first data chunk with first check data calculated for the first data chunk, so that the first check data is accessed together with the first data chunk in a single input/output (I/O) operation directed to the first data chunk, wherein first data is stored across one or more storage devices in data chunks, so that the first data chunk and first check data are stored on a first storage device, and one or more additional associated data chunks of the first data and associated additional check data are stored on at least one of the first storage device or one or more additional storage devices;
    storing at least a portion of the first check data and at least a portion of the additional check data to a second storage device, so that the portion of the first check data is accessed together with the portion of the additional check data in a single I/O operation directed to the second storage device, wherein the second storage device is distinct from the first storage device and the additional storage devices; and
    minimizing I/O access to the second storage device by retaining at least a portion of the first check data and at least a portion of the additional check data in a readily accessible storage medium, during servicing of a first I/O request, wherein the associating, storing, and minimizing are performed by one or more drive proxies implemented to virtualize the first storage device and the additional storage devices.

2. The method of claim 1, wherein the minimizing comprises:
    reading, during servicing of the first I/O request directed to read the first data chunk, the portions of the first check data and the additional check data from the second storage device; and
    retaining, during servicing of the first I/O request, the read portions of the first check data and the additional check data until any additional I/O requests directed to the additional data chunks finish accessing the portion of the additional check data that was read together with the portion of the first check data from the second storage device.

3. The method of claim 1, wherein the minimizing comprises:
  updating, during servicing of the first I/O request directed to write the first data chunk, the portion of the first check data stored on the second storage device; and
  retaining, during servicing of the first I/O request, the updated portion of the first check data until any additional I/O requests directed to write one or more additional associated data chunks finish updating the portion of the additional check data.

4. The method of claim 1, wherein an I/O manager assists the drive proxies in the minimizing by:
  allocating a shared data structure;
  inserting stripe information, information relating to the first I/O request and the first storage device, and information relating to any additional I/O requests to the first storage device or the additional storage devices into the shared data structure; and
  appending the shared data structure to the first I/O request and each of the additional I/O requests.

5. The method of claim 1, wherein the minimizing comprises maintaining a common cache to store the portion of the first check data.

6. The method of claim 1, wherein check data associated with a data chunk is used to validate the data chunk.

7. The method of claim 1, wherein a portion of check data stored on the second storage device is used to validate the check data stored on the first device.

8. The method of claim 1, wherein the associating, storing, and minimizing are performed by a single drive proxy, wherein the single drive proxy is a disk interface.

9. A system for validating data in a storage system, the system comprising:
  a controller in communication with one or more first storage devices for storing first data, wherein the first data is comprised of data chunks,
  wherein each data chunk is associated with check data stored with the data chunk such that a first data chunk and associated first check data are accessed in a single input/output (I/O) operation, and the first check data is used to validate the first data chunk;
  wherein a second storage device stores a portion of the first check data and a portion of additional check data associated with additional data chunks from among the data chunks, such that the stored portions are accessed in a single I/O operation, and the portion of the first check data is used to validate the first check data; and
  wherein one or more drive proxies virtualize the first storage devices and minimize I/O accesses to the second storage device, wherein the drive proxies access the stored portions of the first check data and the additional check data, in response to receiving I/O requests to read or write the first data.

10. The system of claim 9, wherein the minimizing comprises:
  reading, during servicing of a first I/O request directed to read the first data chunk, the stored portions of the first check data and the additional check data from the second storage device; and
  retaining, during servicing of the first I/O request, the read portions of the first check data and the additional check data until any additional I/O requests directed to the additional data chunks finish accessing the portion of the additional check data that was read together with the portion of the first check data from the second storage device.

11. The system of claim 9, wherein the minimizing comprises:
  updating, during servicing of a first I/O request directed to write the first data chunk, the portion of the first check data stored on the second storage device; and
  retaining, during servicing of the first I/O request, the updated portion of the first check data until any additional I/O requests directed to write one or more additional associated data chunks finish updating the portion of the additional check data.

12. The system of claim 9, wherein an I/O manager assists the drive proxies in the minimizing by:
  allocating a shared data structure;
  inserting stripe information, information relating to the first I/O request and the first storage device, and information relating to any additional I/O requests to the first storage device or the additional storage devices into the shared data structure; and
  appending the shared data structure to the first I/O request and each of the additional I/O requests.

13. The system of claim 9, wherein the minimizing comprises maintaining a common cache to store the portion of the first check data.

14. A computer program product comprising a computer useable storage medium having a computer readable program, wherein the computer readable program when executed on a computer causes the computer to:
  associate a first data chunk with first check data calculated for the first data chunk, so that the first check data is accessed together with the first data chunk in a single input/output (I/O) operation directed to the first data chunk,
  wherein first data is stored across one or more storage devices in data chunks, so that the first data chunk and the first check data are stored on a first storage device, and one or more additional associated data chunks of the first data and associated additional check data are stored on at least one of the first storage device or one or more additional storage devices;
  store at least a portion of the first check data and at least a portion of the additional check data to a second storage device, so that the portion of the first check data is accessed together with the portion of the additional check data in a single I/O operation directed to the second storage device,
  wherein the second storage device is distinct from the first storage device and the additional storage devices; and
  minimize I/O access to the second storage device by retaining at least a portion of the first check data and at least a portion of the additional check data in a readily accessible storage medium, during servicing of a first I/O request,
  wherein the associating, storing, and minimizing are performed by one or more drive proxies implemented to virtualize the first storage device and the additional storage devices.

15. The computer program product of claim 14, wherein the computer readable program when executed on a computer further causes the computer to:
  read, during servicing of the first I/O request directed to read the first data chunk, the portions of the first check data and the additional check data from the second storage device; and
  retain, during servicing of the first I/O request, the read portions of the first check data and the additional check data until any additional I/O requests directed to the additional data chunks finish accessing the portion of the additional check data that was read together with the portion of the first check data from the second storage device.

16. The computer program product of claim 14, wherein the computer readable program when executed on a computer further causes the computer to:
   update, during servicing of the first I/O request directed to write the first data chunk, the portion of the first check data stored on the second storage device; and
   retain, during servicing of the first I/O request, the updated portion of the first check data until any additional I/O requests directed to write one or more additional associated data chunks finish updating the portion of the additional check data.

17. The computer program product of claim 14, wherein the computer readable program when executed on a computer further causes the computer to:
   allocate a shared data structure;
   insert stripe information, information relating to the first I/O request and the first storage device, and information relating to any additional I/O requests to the first storage device or the additional storage devices into the shared data structure; and
   append the shared data structure to the first I/O request and each of the additional I/O requests.

18. The computer program product of claim 14, wherein the computer readable program when executed on a computer further causes the computer to maintain a common cache to store the portion of the first check data.

19. The computer program product of claim 14, wherein the computer readable program when executed on a computer further causes the computer to validate a data chunk with associated check data.

20. The computer program product of claim 14, wherein the computer readable program when executed on a computer further causes the computer to validate check data stored on the first device with a portion of the check data stored on the second storage device.

* * * * *